(12) United States Patent
Bello (10) Patent No.: US 11,314,275 B2
(45) Date of Patent: Apr. 26, 2022

(54) ADAPTABLE EDUCATIONAL DEVICE

(71) Applicant: Ameerah Anakaona Bello, Atlanta, GA (US)

(72) Inventor: Ameerah Anakaona Bello, Atlanta, GA (US)

( * ) Notice: Subject to any disclaimer, the term of this patent is extended or adjusted under 35 U.S.C. 154(b) by 291 days.

(21) Appl. No.: 16/523,265

(22) Filed: Jul. 26, 2019

(65) Prior Publication Data

US 2021/0026395 A1  Jan. 28, 2021

(51) Int. Cl.
*G06C 1/00* (2006.01)
*G09B 1/02* (2006.01)

(52) U.S. Cl.
CPC ................. *G06C 1/00* (2013.01); *G09B 1/02* (2013.01)

(58) Field of Classification Search
CPC ...................................................... G09C 1/00
USPC ....................................................... 434/203
See application file for complete search history.

(56) References Cited

U.S. PATENT DOCUMENTS

| | | | |
|---|---|---|---|
| 3,387,392 A | 6/1968 | Kurz | |
| 3,508,348 A * | 4/1970 | Harada | ..................... G06C 1/00 434/203 |
| 4,629,429 A * | 12/1986 | Horie | ....................... G06C 1/00 434/203 |
| 5,395,245 A | 3/1995 | Heinz | |
| D399,522 S | 10/1998 | Nye et al. | |
| D433,055 S | 10/2000 | Hanthorn | |
| 6,171,111 B1 | 1/2001 | Buckner | |
| 6,676,415 B2 | 1/2004 | Walker et al. | |
| 6,712,614 B1 | 3/2004 | Henderson | |
| 6,915,761 B1 | 7/2005 | Campbell | |
| 7,354,272 B1 | 4/2008 | Zev | |
| 9,880,582 B2 | 1/2018 | Herrmann | |
| D812,131 S | 3/2018 | Lengdorfer | |
| 2005/0130106 A1 | 6/2005 | Ho | |
| 2011/0136087 A1 * | 6/2011 | Corridon | ................ A63B 69/00 434/247 |
| 2012/0028229 A1 | 2/2012 | Harte | |
| 2013/0236864 A1 | 9/2013 | Harte | |

FOREIGN PATENT DOCUMENTS

| | | | | |
|---|---|---|---|---|
| CH | 670719 A5 * | 6/1989 | ............... | G06C 1/00 |
| CN | 209132658 U * | 7/2019 | | |
| FR | 2036508 A5 * | 12/1970 | ............... | G06C 1/00 |
| WO | 2013/088450 A1 | 6/2013 | | |

OTHER PUBLICATIONS

CN-209132658-U English Translation (Year: 2019).*

* cited by examiner

*Primary Examiner* — Kyle R Grabowski
(74) *Attorney, Agent, or Firm* — Kilpatrick Townsend & Stockton LLP (57) ABSTRACT

An educational device for counting and mathematics. The educational device includes a frame that includes a first end, a second end, and a releasable connection point configured to attach to an additional frame. The educational device further includes a first group adjacent to the first end and including a bead. The educational device further includes a second group adjacent to the second end and including a second bead. The educational device can further include a divider located between the first and the second end. The divider can separate the first group from the second group.

16 Claims, 8 Drawing Sheets

ADAPTABLE EDUCATIONAL DEVICE

TECHNICAL FIELD

This disclosure relates generally to educational devices. More specifically, and without limitation, this disclosure relates to a mechanical educational device to aid children with calculations and counting.

BACKGROUND

Counting devices such as educational devices suffer from deficiencies that make them difficult to be used for educational purposes or by small children. For example, current solutions may be limited by a fixed structure and therefore cannot adapt to differing counting abilities. Further, some solutions are not easily used by children, for example, due to beads that do not maintain their location or an inability to use the device in different positions such as in an upright position or a horizontal position.

Therefore, new solutions are needed.

SUMMARY

Systems and methods are disclosed herein for an educational device. The educational device includes a frame that includes a first end, a second end, and a releasable connection point configured to attach to an additional frame. The educational device further includes a first group adjacent to the first end and including a bead. The bead can have a first curvilinear side and a first linear side. The educational device further includes a second group adjacent to the second end and including a second bead. The second bead can have a second curvilinear side and a second linear side. The educational device can further include a divider located between the first and the second end. The divider can separate the first group from the second group.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

DETAILED DESCRIPTION

As discussed above, existing solutions for counting devices suffer certain deficiencies. The present disclosure provides improvements that include, but are not limited to, improved bead shape, anti-slip material, and detachability of the frame.

Embodiments of the present invention relate to an educational device. The educational device can be used for counting or arithmetic. In an example, the educational device includes a frame having a first end (e.g., a bottom end), a second end (e.g., a top end), and an inner portion. The educational device can include one or more support structures, each of which can have one or more beads disposed thereon. For example, the first end and the inner portion can include a first support structure, thereby creating a first group of beads and the second end and the inner portion can include a second support structure, thereby creating a second group of beads.

The groups of beads can represent different ranges of numbers. For example, assuming a base-ten number system, the first group (sometimes referred to as a "number beam") may have four beads located on the first support structure and the second group (sometimes referred to as an "answer beam") may have a second support structure that includes a single bead. The first group is used to represent numbers from zero to four and the second group is used to represent a number five. When a particular bead is raised, the number representing the bead is added to a total.

For example, with respect to the first group, if the bead is raised, the total is one, if a first and second bead are raised, then the total is two, and so on. When the bead on the second group is raised, the total is raised by five. Therefore, by using the first group and the second group, numbers from zero to nine can be represented. In this manner, the educational device can be used to learn mathematics such as counting.

Additional variations are possible. For example, in an embodiment, the beads can be curved. For example, each bead can have a curvilinear side and a linear side. The linear side can facilitate use of the educational device on a table, avoiding protruding beads. This shaping of the bead provides improved counting performance at multiple vantage points of the educational device.

In another embodiment, the frame of the educational device includes one or more removable connection points on the first end, second end, or inner portion that facilitate attachment of an additional educational device or an end frame. This modular nature of these attachments facilitates the creation of different educational device configurations such as variants with single, double, or triple support structures. Therefore, using base-ten as an example, the single variant can represent numbers zero to nine, the double variant can represent numbers from ten to 99, and so on. In this manner, the educational device can be customized to a particular skill level of the user of the educational device.

Figure 1:
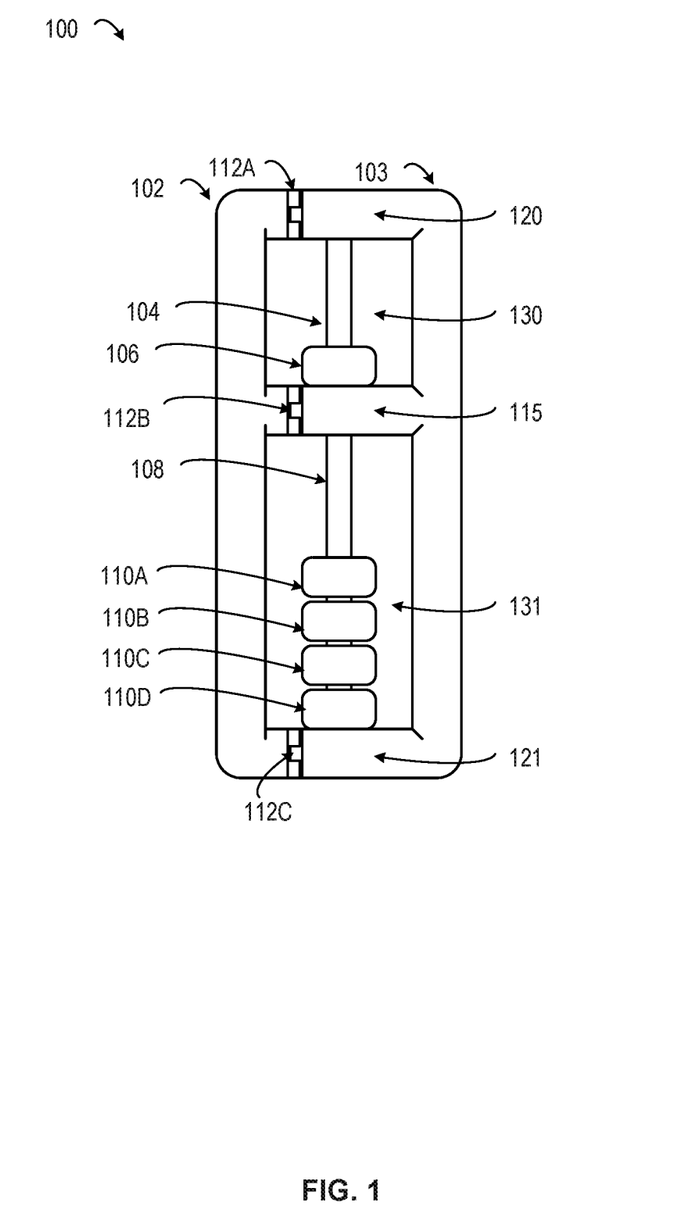
FIG. 1 is a diagram depicting a front view of an educational device, according to an embodiment of the present disclosure.

Turning now to the figures, FIG. 1 is a diagram depicting a front view of an educational device, according to an embodiment of the present disclosure. FIG. 1 depicts educational device 100, which includes frame 103 and closing frame 102. For example purposes, frame 103 is shown as connecting to closing frame 102. But, as further explained herein, frame 103 can also connect to other types of frames.

Frame 103 includes a first end 120, a second end 121, and an inner portion 115. First end 120 can be a bottom end and second end 121 can be a top end, or vice versa. Inner portion 115 can be equidistant between first end 120 and second end 121, or anywhere between first end 120 and second end 121. The first end 120 and inner portion 115 create a first group 130. The second end 121 and inner portion 115 create a second group 131.

Figure 7:
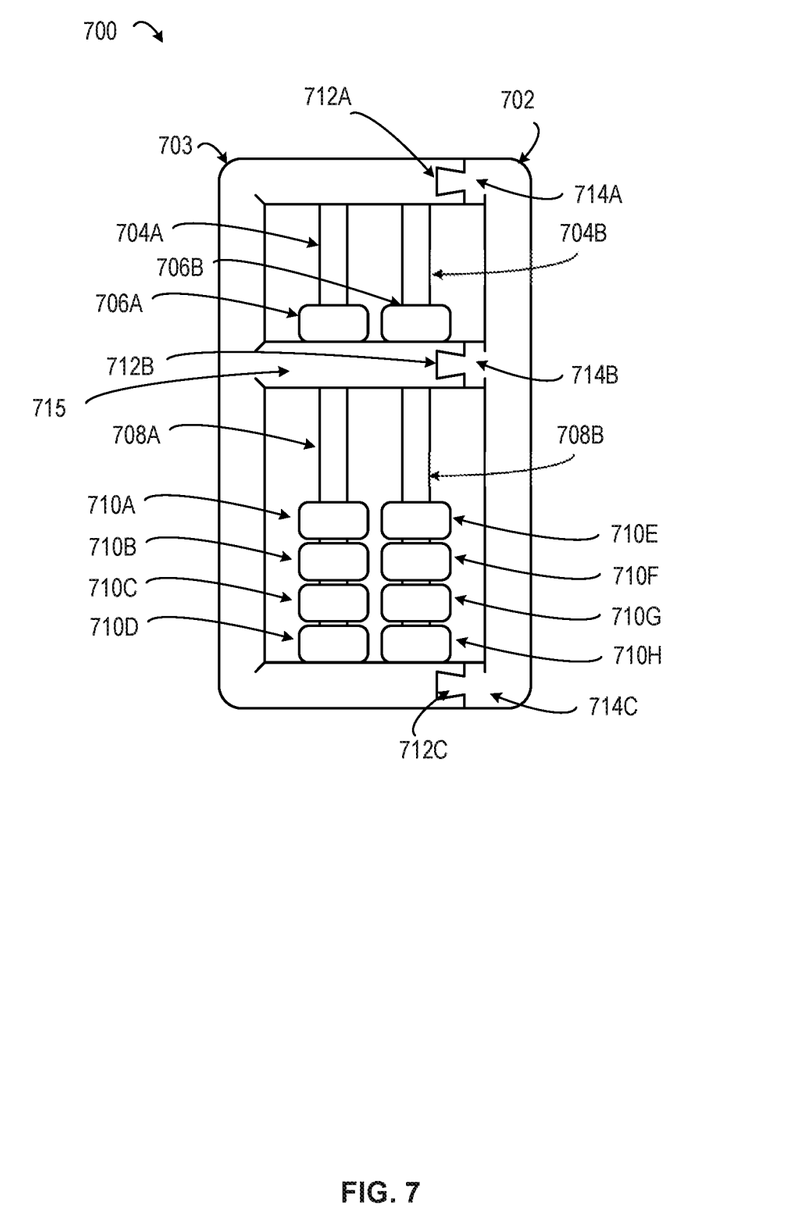
FIG. 7 is a diagram depicting a front view of an educational device in a double configuration, according to an embodiment of the present disclosure.
Figure 8:
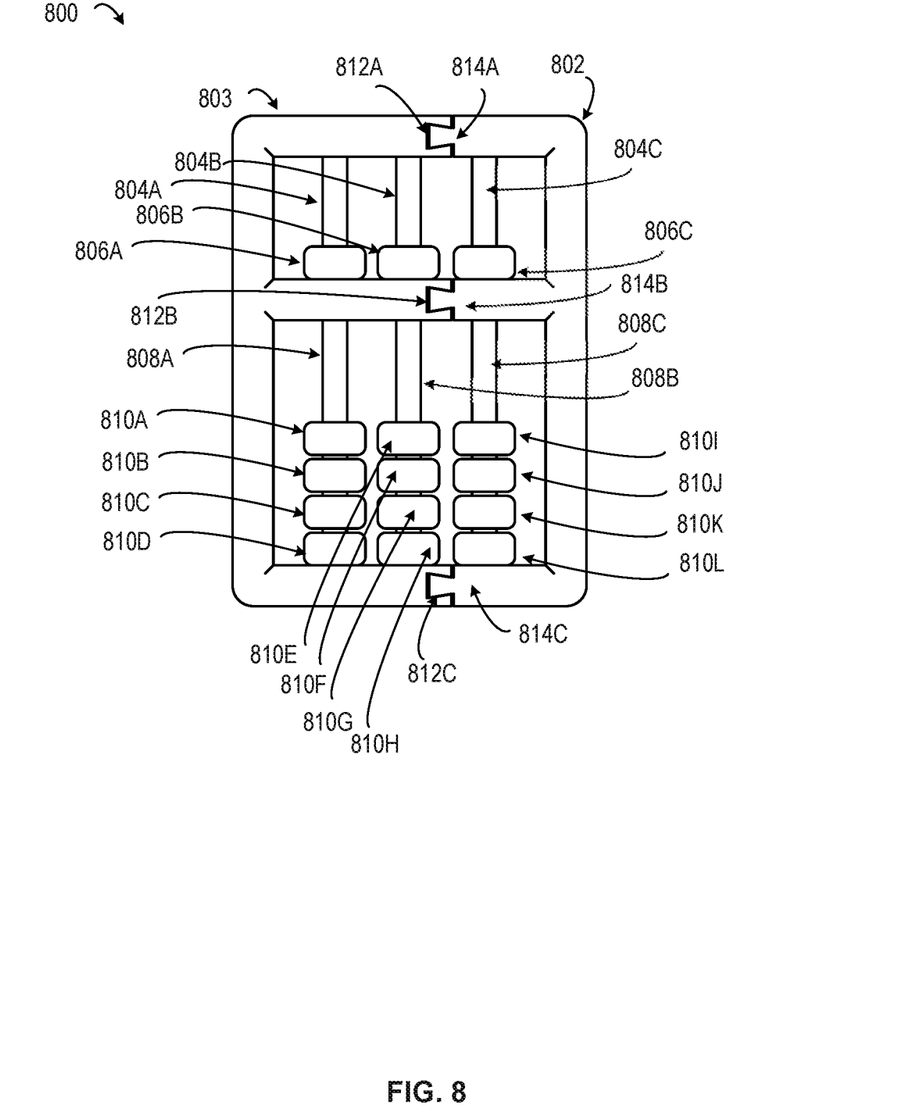
FIG. 8 is a diagram depicting a front view of an educational device in a triple configuration, according to an embodiment of the present disclosure.

The first group 130 includes a first support structure 104 on which is disposed a bead 106. The second group 131 includes a second support structure 108 on which are disposed additional beads 110A, 110B, 110C, and 110D. In some cases, the first support structure 104 and the second support structure 108 can be the same support structure. For example, a single support structure can connect to first end 120, be routed through inner portion 115, and connect to second end 121. Together, the first support structure 104 and the second support structure 108 form a column. Therefore, as depicted, frame 103 has a single column and is therefore in a single configuration. An example of a double configuration (with two columns) is shown in FIG. 7, and an example of a triple configuration (with three columns) is shown in FIG. 8.

The educational device 100 further includes three releasable removable connection points: a top connection point 112A, an inner connection point 112B, and a bottom connection point 112C. The removable connection points 112A-C are discussed further with respect to FIG. 2.

Educational device 100 can be made of various materials. Examples include wood, plastic, ferrous materials, and polymer. In an example, frame 103 and closing frame 102 are manufactured from wood, first support structure 104 from metal, and second support structure 108 from metal. In another example, the frame 103 and the closing frame 102 are manufactured from a composite polymer and the first support structure 104 and the second support structure are made of a wooden material.

Frame 103 and closing frame 102 can be any suitable shape. Examples of suitable shapes include rectangular, square, or curved. The height of the frames can be greater than the width, or vice versa. Further, the frame 103 and closing frame 102 can have edges that are straight or curved.

Figure 4:
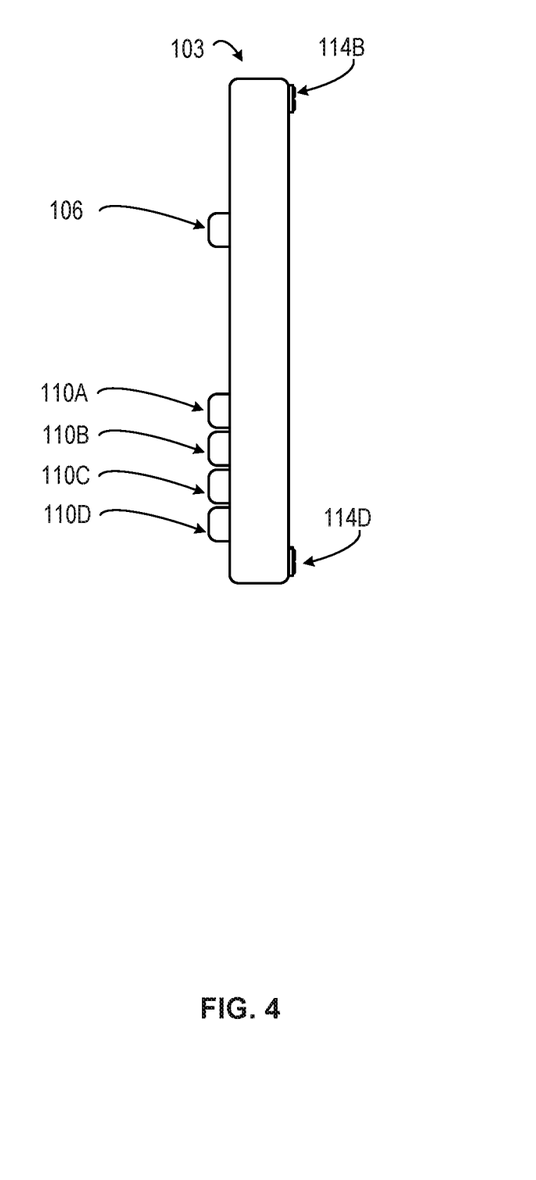
FIG. 4 is a diagram depicting a side view of the educational device depicted in FIGS. 1-3, according to an embodiment of the present disclosure.
Figure 5:
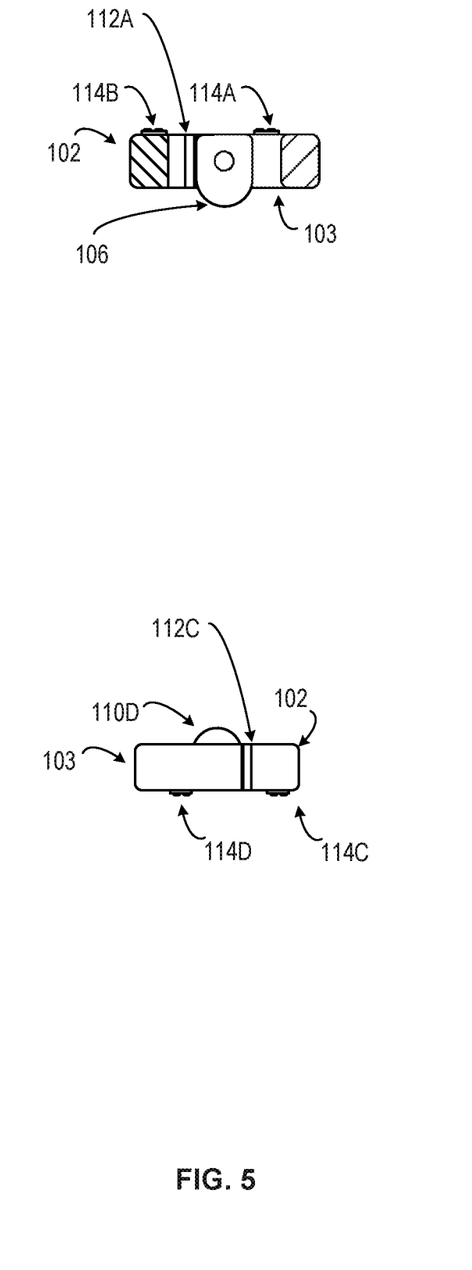
FIG. 5 is a diagram depicting a top view of the educational device depicted in FIGS. 1-4, according to an embodiment of the present disclosure.

In an embodiment, the bead 106 and the additional beads 110A-D can each have a curvilinear side and a flat side, as described further with respect to FIGS. 4 and 5. In other cases, bead 106 and the additional beads 110 are oval or circular in shape. Other shapes are possible such as stars, squares, and the like.

In an embodiment, the educational device is designed to ensure that the beads do not easily slip, e.g., due to gravity, when raised or lowered on a support structure. Different mechanisms are possible to implement this feature. For example, the beads can have a tolerance that is sufficiently small as to create friction between the support structure and the beads. In this manner, the beads rest at their configured location on the support structure and do not shift due to gravity. For example, the support structure can have a cross-section that is circular, with a diameter that is within a small tolerance of the diameter of the aperture in the beads. In another embodiment, the support structure includes one or more semi-adhesive devices such as rubber bands that secure the beads in place when the beads are moved upward and downward.

In another embodiment, educational device 100 can connect to additional identical or similar educational devices via the use of removable connection points 112A-C (i.e., 112A, 112B, 112C). Removable connection points 112A-C are discussed further with respect to FIG. 2. The customization of the combination of support structures and beads enables children of varying abilities and ages to count to different numbers on educational device 100.

Figure 2:
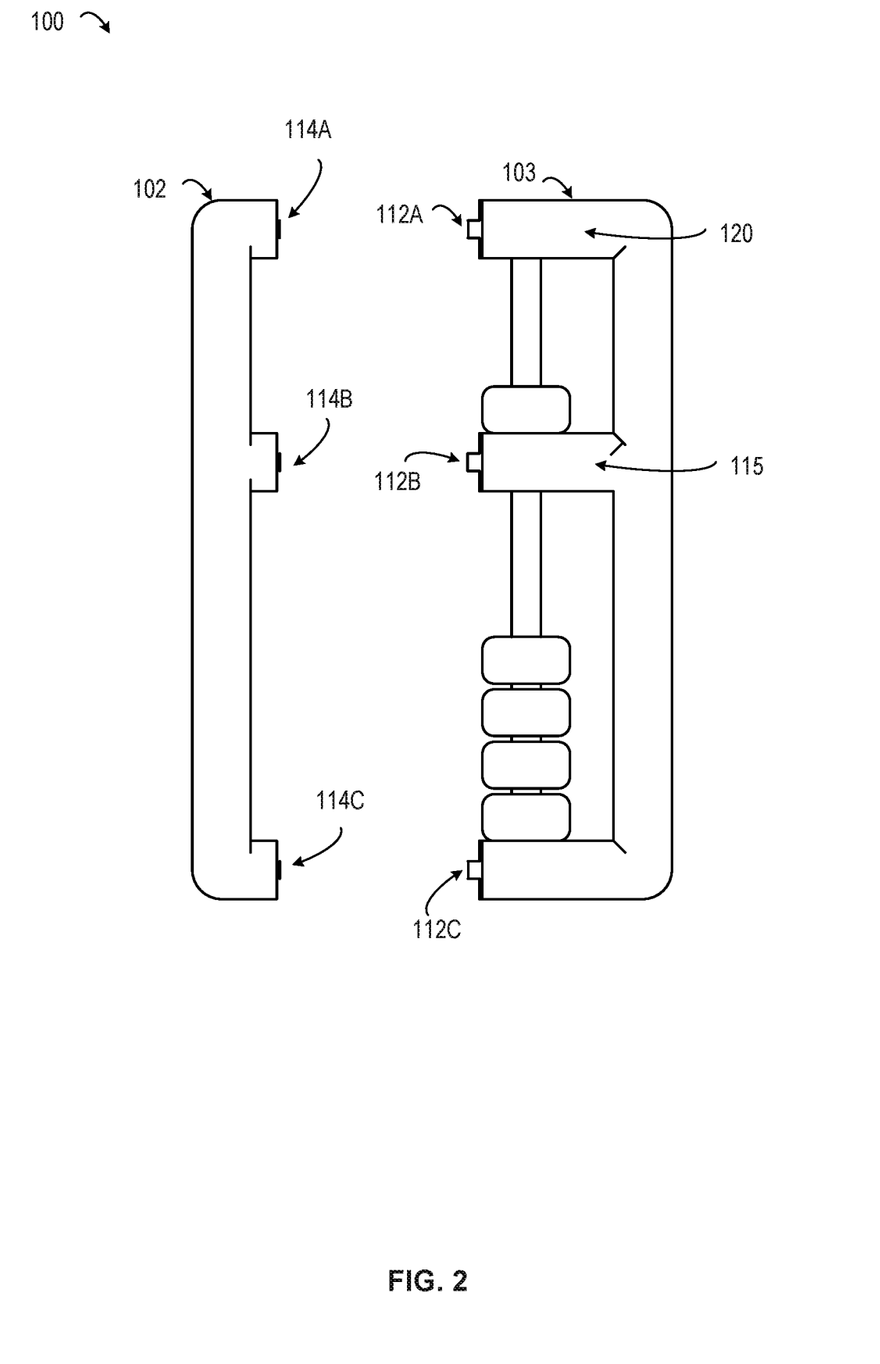
FIG. 2 is a diagram depicting the educational device depicted in FIG. 1 in a detached configuration, according to an embodiment of the present disclosure.

FIG. 2 is a diagram depicting the educational device depicted in FIG. 1 in a detached configuration, according to an embodiment of the present disclosure. The detachable configuration provides a modular design that allows for customization of the educational device 100. An example of possible customizations are discussed with respect to FIGS. 7-8.

FIG. 2 includes the frame 103 and the closing frame 102. Frame 103 includes first end 120, inner portion 115, second end 121, and removable connection points 112A-C. Closing frame 102 includes removable connection points 114A-C. Removable connection points 112A-C are configured to connect to removable connection points 114A-C respectively.

For example purposes, three removable connection points are shown, but other numbers of removable connection points are possible. The removable connection points can be any suitable attachment mechanism such as hook and loop, socket, magnets, depression and pin combination, a latch, etc. For example, the removable connection points can hold together via a threshold amount of tension that can be broken to separate the frames.

As depicted, the removable connection points 112A-C protrude from the frame 103 and are inserted into a corresponding depression or cavity such as removable connection points 114A-C of closing frame 102. In an embodiment, the removable connection points 112A-C include a mechanism for locking the frame 103 and the closing frame 102 into a fixed position with each other.

The removable connection points 112A-C allow a modular design for customization of the educational device 100 with regard to a number of support structures and beads. The customization of the combination of support structures and beads enables children of varying abilities and ages to count to different numbers on educational device 100.

For example, via the removable connection points, the educational device can connect to additional educational devices to form an educational device that is adaptable to various counting methods and numbers. In an embodiment, an educational device includes a double variant. An example configuration is shown in more detail with respect to FIG. 7. Additionally, a triple variant is possible, for example, by combining a single variant and a double variant, as depicted in FIG. 8.

Figure 3:
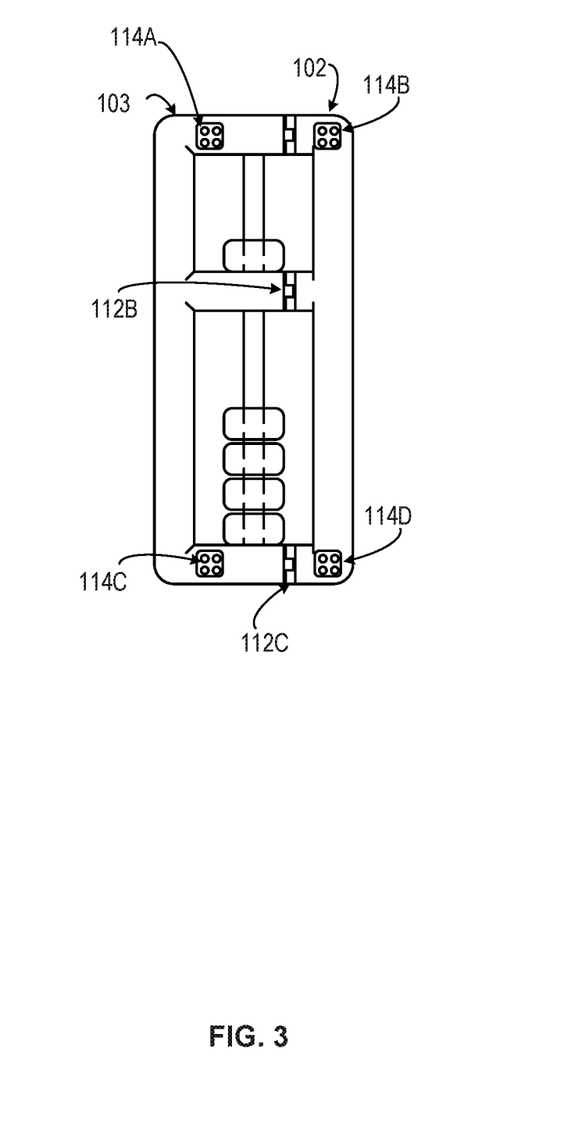
FIG. 3 is a diagram depicting a rear view of the educational device depicted in FIGS. 1-2, according to an embodiment of the present disclosure.

FIG. 3 is a diagram depicting a rear view of the educational device depicted in FIGS. 1-2, according to an embodiment of the present disclosure. FIG. 3 includes the frame 103 and the closing frame 102. The frame 103 includes removable connection points 112A-C, non-slip foot 114A, and non-slip foot 114C. Closing frame 102 includes non-slip foot 114B and non-slip foot 114D.

Non-slip feet 114A-D can be made of any material that has a high coefficient of friction or an adhesive characteristic that prevents the educational device 100 from sliding or slipping when placed on a surface. Examples of suitable materials are a polymer material, rubber, plastic, or silicone.

FIG. 4 is a diagram depicting a side view of the educational device depicted in FIGS. 1-3, according to an embodiment of the present disclosure. FIG. 4 includes frame 103, a first support structure 104, bead 106, additional beads 110, non-slip foot 114B, and non-slip foot 114D. Non-slip foot 114A and non-slip foot 114C are obscured in the view of FIG. 4.

FIG. 5 is a diagram depicting a top view of the educational device depicted in FIGS. 1-4, according to an embodiment of the present disclosure. FIG. 5 includes frame 103, the closing frame 102, bead 106, additional beads 110, non-slip foot 114B, non-slip foot 114D. FIG. 5 includes a first support structure 104 and a second support structure 108 that are obscured in the view of FIG. 5. The opposing sides of the removable connection points 112A-C are obscured from the view of FIG. 5. However, the removable connection points 112A-C are a combination of a protrusion from the frame 103 and a corresponding depression or cavity in the closing frame 102. The combination of protrusion and cavity form each removable connection point 112A-C for locking the frame 103 and the frame 103 into a fixed position with regard to each other.

Figure 6:
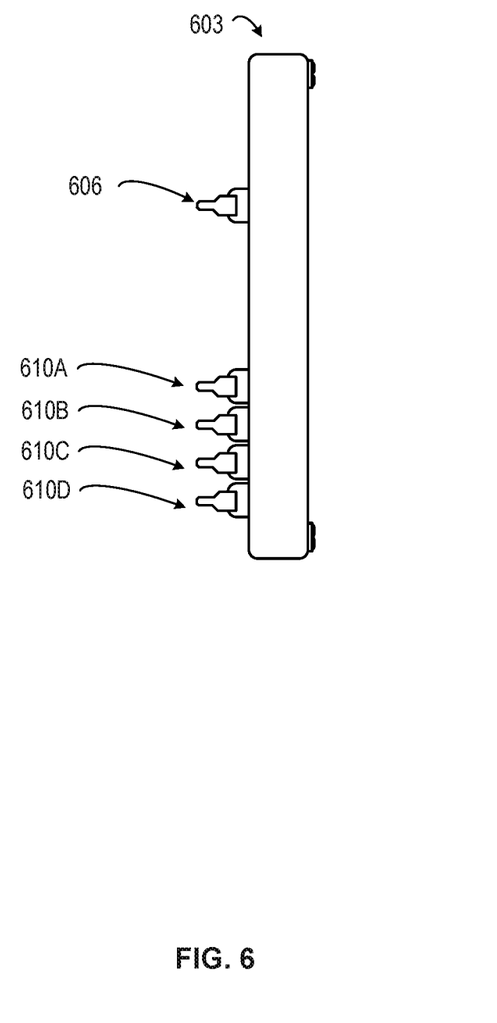
FIG. 6 is a diagram depicting a side view of an educational device, according to an embodiment of the present disclosure.

FIG. 6 is a diagram depicting a side view of an educational device, according to an embodiment of the present disclosure. FIG. 6 includes frame 603, a first support structure 104, bead 606, and additional beads 610A-C.

As depicted, bead 606 and additional beads 610A-C each include a lip. Each lip protrudes from the respective bead. As compared to the bead 106 and the additional beads 110A-C, a presence of the lip can assist a user, for example, a small child, with moving the bead. A lip can be integrated with the bead in such a way that the lip and bead are manufactured out of one material, e.g., plastic or wood. Alternatively, a lip can be made separately and affixed or joined to a bead.

FIG. 7 is a diagram depicting a front view of an educational device in a double configuration, according to an embodiment of the present disclosure. FIG. 7 depicts educational device 700, which is a configuration of an educational device 100 with two rows of support structures. Educational device 700 enables counting to various numerical quantities. For example, assuming a base-ten system, the three-rod configuration enables counting from zero to 99.

Educational device 700 includes end frame 702 and frame 703. Frame 703 includes a first support structure 704A, a second support structure 708A, a third support structure 704B, and a fourth support structure 708B. For example purposes, four support structures are shown, but in another configuration, frame 703 can include two support structures, each extending through the inner portion.

Bead 706A is disposed on the first support structure 704A. Additional beads 710A, 710B, 710C, and 710D are disposed on a second support structure 708A. Bead 706B is disposed on the third support structure 704B. Additional beads 710E, 710F, 710G, and 710H are disposed on the fourth support structure 708B. Frame 703 further includes a top connection point 712A, an inner portion connection point 712B, and a bottom removable connection point 712C. End frame 702 includes a top connection point 714A, an inner portion connection point 714B, and a bottom removable connection points 714C, which are configured to connect to removable connection points 712A-C respectively.

FIG. 8 is a diagram depicting a front view of an educational device in a triple configuration, according to an embodiment of the present disclosure. FIG. 8 depicts educational device 800. Educational device 800 includes single frame 802 and double frame 803.

Single frame 802 includes support structure 804C, which includes bead 806C, and support structure 808C, which includes beads 810I-L. Single frame 802 further includes a top connection point 814A, an inner portion connection point 814B, and a bottom connection point 814C Double frame 803 includes support structure 804A, which includes bead 806A; support structure 808A, which includes beads 810A-D; support structure 804B, which includes bead 806B, and support structure 808B, which includes beads 810E-H. Double frame 803 further includes a top connection point 812A, an inner portion connection point 812B, and a bottom connection point 812C.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to, such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. An educational device comprising:
   (i) a first frame comprising:
      a first end comprising a first releasable connection point;
      a second end comprising a second releasable connection point;
      a first group of beads adjacent to the first end; and
      a second group of beads adjacent to the second end; and
   (ii) a second frame comprising:
      a third end comprising a third releasable connection point that is attachable and detachable from the first releasable connection point;
      a fourth end comprising a fourth releasable connection point that is attachable and detachable from the second releasable connection point;
      a third group of beads adjacent to the third end; and
      a fourth group of beads adjacent to the fourth end; and
   (iii) a divider located between (a) the first end and the second end and (b) the third end and the fourth end, wherein the divider separates the first group of beads from the second group of beads and the third group of beads from the fourth group of beads.

2. The educational device of claim 1, wherein:
   the first frame further comprises a first support structure disposed between the first end and the second end,
   the first support structure is routed through the divider,
   each bead of the first group of beads and second group of beads are configured to translate on the first support structure, the second frame further comprises a second support structure disposed between the third end and the fourth end, the second support structure is routed through the divider, and each bead of the third and fourth groups of beads are configured to translate on the second support structure.

3. The educational device of claim 2, wherein one or more of the first support structure and the second support structure is made of metal, one or more of the first frame and the second frame is wooden, and wherein one or more of the beads of the first group of beads, the second group of beads, the third group of beads, and the fourth group of beads are wooden.

4. The educational device of claim 2, wherein the first support structure comprises a first member disposed between the first end and the divider and a second member disposed between the second end and the divider.

5. The educational device of claim 1, wherein one or more of beads of the first group of beads and the second group of beads comprises a curvilinear side that protrudes a first distance from the first frame and a linear side that protrudes a second distance from the first frame, wherein the first distance is greater than the second distance.

6. The educational device of claim 1, wherein one or more of the first frame or the second frame further comprises a rear side comprising a non-slip foot.

7. The educational device of claim 1, further comprising a closing frame comprising:
 a fifth end comprising a fifth releasable connection point, and
 a sixth end comprising a sixth releasable connection point, wherein the fifth releasable connection point is attachable or detachable from the first releasable connection point or the third releasable connection point and the sixth releasable connection point is attachable or detachable from the second releasable connection point or the fourth releasable connection point.

8. The educational device of claim 1, wherein one or more of the first group of beads and the second group of beads comprises a curvilinear side and a lip attached to the curvilinear side.

9. The educational device of claim 1, wherein the second frame comprises a fifth group adjacent to the third end and comprising a fifth bead and a sixth group adjacent to the fourth end and comprising a sixth bead, and wherein second divider further separates the fifth group and sixth group.

10. The educational device of claim 1, wherein the divider includes a first divider attached to the first frame and a second divider attached to the second frame, wherein the first divider and the second divider are releasable connected.

11. An educational device comprising:
 a first frame comprising
  a first end;
  a second end; and
  a releasable connection point that is attachable to or detachable from a second releasable connection point of a second frame;
 and
  a first divider located between the first and the second end, wherein the first divider separates a first group of objects from a second group of objects; and
  a support structure disposed between the first end and the second end, wherein the support structure is routed through the first divider, and wherein the first group of objects and the second group of objects are configured to translate on the support structure,
 wherein the second frame comprises:
  a third end;
  a fourth end;
  a second divider located between the third end and the fourth end; and
  two or more additional support structures disposed between the third end and the fourth end, wherein each of the additional support structures is routed through the second divider and wherein two or more additional objects are configured to translate on each of the additional support structures.

12. The educational device of claim 11, wherein the first frame further comprises a rear side comprising a non-slip foot.

13. The educational device of claim 11, wherein one or more objects in the first group of objects or the second group of objects comprises a curvilinear side and a lip attached to the curvilinear side.

14. An educational device comprising:
 a first frame comprising:
  a first releasable connection point;
  a divider that separates groups of beads; and
  one or more support structures routed through the divider, wherein the groups of beads are configured to translate on the one or more support structures; and
 a second frame comprising:
  a third end;
  a fourth end;
  a second releasable connection point that is attachable to or detachable from the first releasable connection point; and
  two or more additional support structures disposed between the third end and the fourth end, wherein each of the additional support structures is routed through the divider and wherein additional beads are configured to translate on each of the additional support structures, and wherein the divider separates the additional beads.

15. The educational device of claim 14, further comprising a closing frame comprising a third releasable connection point that is attachable to or detachable from the first releasable connection point or the second releasable connection point.

16. The educational device of claim 14, wherein the divider includes a first divider attached to the first frame and a second divider attached to the second frame, wherein the first divider and the second divider are releasable connected.

* * * * *